Sept. 24, 1940.   H. L. TAYLOR   2,215,890
ELECTRICAL RECTIFIER
Filed Jan. 7, 1939
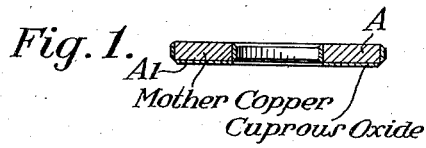
Fig. 1.
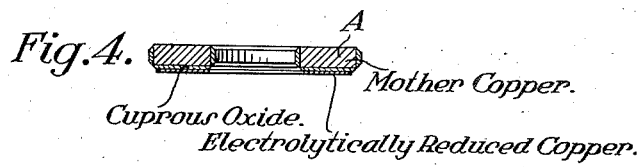
Fig. 4.
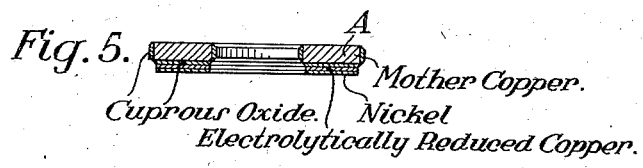
Fig. 5.
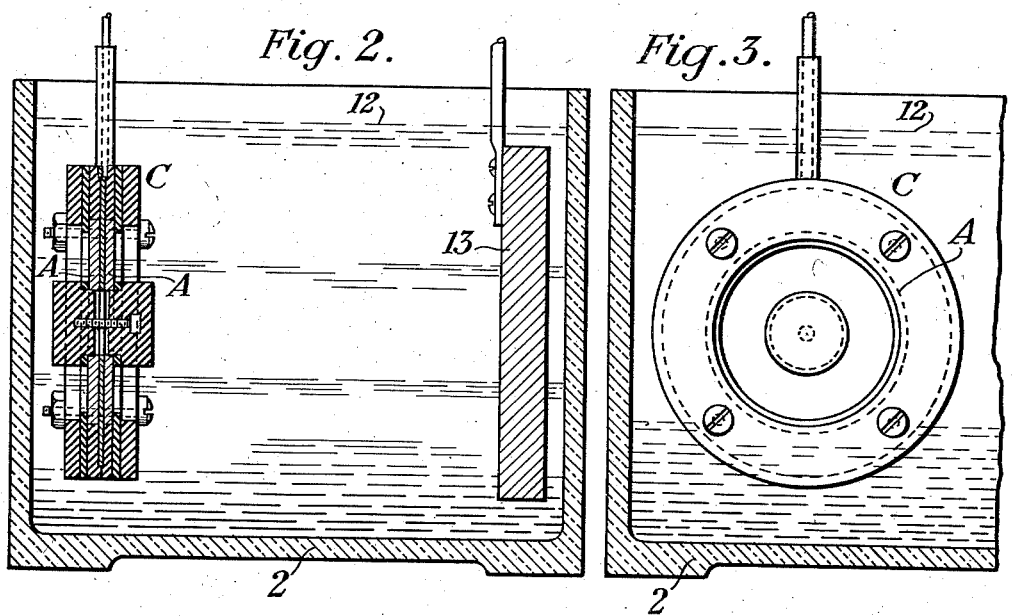
INVENTOR
Herbert L. Taylor.
BY
HIS ATTORNEY Patented Sept. 24, 1940

2,215,890

UNITED STATES PATENT OFFICE 2,215,890

ELECTRICAL RECTIFIER

Herbert L. Taylor, Swissvale, Pa., assignor to The Union Switch & Signal Company, Swissvale, Pa., a corporation of Pennsylvania Application January 7, 1939, Serial No. 249,770

12 Claims. (Cl. 175—366)

My invention relates to electrical rectifiers, and particularly to electrical rectifiers of the well-known copper oxide variety.

More particularly, my present invention relates to processes for making contact with the copper oxide layer of a copper oxide rectifier element, and has for an object to improve the process described and claimed in an application for Letters Patent of the United States, Serial No. 213,876, filed by Philip H. Dowling and John D. McCluer on June 15, 1938, and the process described and claimed in an application for Letters Patent of the United States, Serial No. 291,052, filed by Philip H. Dowling on August 19, 1939, for Electrical rectifiers.

Other objects and characteristic features of my invention will appear as the description proceeds.

I shall describe several forms of rectifiers embodying my invention, and several processes for manufacturing said rectifiers, and shall then point out the novel features thereof in claims.

In the accompanying drawing, Fig. 1 is a view showing a rectifier element as it appears at one step in the process of manufacture embodying my invention. Fig. 2 is a longitudinal sectional view of an electrolytic bath utilized in the process of manufacture embodying my invention. Fig. 3 is a side view of a masking device utilized in connection with the bath shown in Fig. 2 for a purpose which will be made clear in the following specification. Fig. 4 is a vertical sectional view showing a rectifier element as it appears in a further step in the process of manufacture embodying my invention. Fig. 5 is a vertical sectional view similar to Figs. 1 and 4 showing a completed rectifier element constructed in accordance with my invention.

Similar reference characters refer to similar parts in each of the several views.

In accordance with the process disclosed in the above referred to Dowling and McCluer application, copper blanks are first oxidized in the usual and well-known manner, and are then treated to remove the excess oxide coating formed in the oxidation process, the elements at the end of this treatment presenting the appearance shown in Fig. 1 in which A designates the mother copper and A1 the copper oxide remaining on the element. The elements are then electrolytically treated to reduce the outer surface of the cuprous oxide coating to metallic copper by immersing them in a suitable electrolyte 12, such as dilute sulphuric acid, and passing a current through this electrolyte from an insoluble anode 13 to the elements, the elements during this treatment being disposed in a device C, as shown in Figs. 2 and 3, which device serves both as a means for making electrical contact with the mother copper of the elements, and also as a means for masking the outside and inside edges of the elements to seal the edges against the action of the electrolyte for a small annular area inside of the adjacent copper-cuprous oxide junction, whereby the copper oxide of the elements is prevented from being reduced adjacent its edges where it joins the mother metal. The device C in itself forms no part of my invention and inasmuch as this device is described in detail in the said Dowling and McCluer application, it is believed to be unnecessary to describe it further herein. The elements are next removed from the electrolytic reduction bath, thoroughly rinsed in water, and subjected to a vigorous air blast. Following this step each element will appear as shown in Fig. 4, from which it will be seen that the outer flat surface of the copper oxide layer is now coated with a layer of copper. As a next step, the reduced copper layer formed on the elements is coated with a layer of nickel by making the elements, while still mounted in the support C, the cathode in a standard nickel plating solution in the same manner that the elements were made the cathode in the sulphuric acid bath, and passing current at a suitable density through this solution. A standard nickel plating solution which is suitable for this purpose may, for example, comprise nickel sulphate 8 ounces per gallon, ammonium chloride 1 ounce per gallon, boric acid 1 ounce per gallon, sodium chloride 1 ounce per gallon. The current density during this step depends upon the plating solution used and the pH value of that solution, and with the solution just mentioned mechanically agitated and maintained at a pH value of about 5.8, excellent results are obtained with a current density of about 18 amperes per square foot continued for about 2 minutes at room temperature. If the washers are plated for too long a period of time a short circuit may be formed between the nickel and the mother copper, which would destroy the rectifying properties of its element. The maximum permissible current density that can be employed is that at which nickel salts start to become deposited on the elements. The pH value of the nickel plating solution appears to be relatively critical and should preferably be kept below 5.8. The nickel when deposited under the above outlined conditions is bright and very adherent. The finished element will appear as shown in Fig. 5.

It should be pointed out that if the oxidized blanks are thoroughly clean, the nickel can be plated directly onto the cuprous oxide surface without first electrolytically reducing the outer surface of the copper oxide layer to metallic copper in the manner above described. The nickel plating solution under these conditions may be the same as that previously described, and if the acidity of the solution is high and the current density is kept relatively low, the solution will discharge both hydrogen and nickel at the cathode, or in some cases hydrogen alone. The hydrogen will reduce the cuprous oxide to metallic copper and by properly controlling the acidity of the plating solution and the current density, an underlying layer of copper will be produced next to the cuprous oxide, which layer will be covered by an outer layer of nickel.

It should further be pointed out, however, that good coats of nickel, with no visible evidence of copper under them, can be deposited directly onto the copper oxide with the hereinbefore described nickel plating solution at current densities of the order of 5 or 6 amperes per square foot in a time of between 5 and 10 minutes when the pH value of the solution is about 5.8.

It is believed that the foregoing description of the process disclosed in the said Dowling and McCluer application is sufficiently complete for a clear understanding of my present invention, but if a more complete description of this process is desired reference may be had to the said Dowling and McCluer application.

The process disclosed in the previously mentioned Dowling application is identical with that disclosed in the said Dowling and McCluer application up to the point where the elements are treated to electrolytically reduce the outer surface of the copper oxide layer to metallic copper. In accordance with the said Dowling process, this reduction is accomplished by mounting the elements in the device C and then immersing them in an electrolytic bath comprising a dilute solution of ammonium hydroxide and passing a current through this bath to the elements in the same manner as described hereinbefore. An ammoniacal solution which has been found suitable for this purpose may, for example, consist of .2 per cent by volume of concentrated ammonium hydroxide in water at room temperature, excellent results being obtained with this solution with a current density of about 12 amperes per square foot maintained for a period of from 3 to 5 minutes, the reduced copper under these conditions being bright, fine grained, extremely adherent, and disposed as a continuous film over the entire exposed face of the elements. The ammoniacal solution specified has a relatively high resistance, making necessary a relatively high voltage, and while lower concentrations of the ammonium hydroxide may be used, the voltage required to effect the desired reduction increases as the concentration decreases. In some instances it may be desirable to accomplish reduction at a lower voltage, and this result may be obtained either by using a higher concentration of ammonium hydroxide, or by adding a small quantity of a soluble salt to the above specified solution. For example, if 0.58 by volume of a saturated (25° C.) solution of $(NH_4)_2SO_4$ is added to the above solution, the voltage required to accomplish the reduction will be decreased two-thirds. The amount of reduction which can be used depends upon the original thickness of the oxide, and if the reduction is continued for too long a time there is a tendency for the reduced copper to penetrate the oxide a sufficient amount to reach the mother copper, which condition may result in short circuiting the rectifier elements.

Upon removing the elements from the electrolytic reduction bath, the elements are thoroughly rinsed in several rinse waters, the last rinse water preferably being distilled water and the elements are then subjected to a vigorous blast of compressed air. The air blast appears to have the effect of blowing out some of the gas and liquid which collects in the pores of the reduced copper, and seems to be helpful in preparing the elements for the next step. Good results can, however, be obtained without the air blast. This step consists in electrolytically depositing a layer of nickel onto the reduced copper, and may be accomplished in the manner previously described in connection with the process disclosed in the said Dowling and McCluer application. However, in accordance with the process disclosed in the Dowling application a more concentrated nickel plating solution than that utilized in the said Dowling and McCluer application is preferred. This latter solution may, for example, comprise $NiSO_4.7H_2O$, 27 ounces per gallon; boric acid, 6 ounces per gallon; $NiCl_2.6H_2O$, 4 ounces per gallon. This latter solution is well-known, but appears to be better adapted for the plating of the reduced copper surface than the solution referred to in the previously described Dowling and McCluer application.

The current density during this step depends upon the pH value of the plating solution and the degree of agitation of the solution; and with the solution mentioned above having its pH value maintained between 5 and 5.2, excellent results are obtained with a current density of about 12 amperes per square foot continued for about 3 minutes at room temperature with no agitation of the bath. As the pH value is increased mechanical agitation becomes increasingly necessary. In adjusting the pH value of the solution ammonium hydroxide or sulphuric acid may be used. It is desirable to keep the solution clear and free from suspended matter by filtering when necessary. While the current density specified and the plating time specified are not very critical, too low or too high a current density and too short or too long a plating time tends to produce either high forward resistances or rectifiers which will not stand unprotected exposure to moisture very well.

When the reduced copper surfaces are plated in the manner just described, the rectifier elements tend to have high forward resistances immediately after plating. If, however, the elements are allowed to stand after they have been plated the forward resistance will improve until a minimum value is reached at which this resistance becomes stable. This stabilization can be accelerated by the application of heat. A minimum treatment of 1 hour at 80° C. has been found to be satisfactory. Other temperatures at times may, however, be used, the necessary minimum time decreasing as the temperature increases. Temperatures higher than 125° C. should not be employed, and in general the minimum time for stabilization should not be greatly exceeded so that the forward resistance of the rectifier will not be unduly increased by the well known effect of high temperatures on rectifiers of this type. However, it has heretofore been customary to preage the rectifier elements for certain applications by a thermal treatment consisting of approximately a 16 to a 24 hour bake at 100° C., and when this last mentioned treatment is employed the stabilizing heat treatment just described may be eliminated.

I have found that when contact is made with the cuprous oxide surface of a copper oxide rectifier element by means of either of the processes just described a small percentage of the elements appear to have somewhat lower resistances in the high resistance direction than the remaining elements with the result that these latter elements are not as efficient as the remaining elements, and permit somewhat higher back current to flow in service than is desirable. I have further found that the edges of these elements appear to be stained, the stains probably being produced due to the plating solution leaking past the masks, and that by giving these elements a quick dip, about 1 second, in concentrated nitric acid the back currents at a given voltage can be lowered to values comparable with the other elements, and that the forward currents will remain of the same order as before the quick dip. This dip also appears to remove the stains from the elements.

This dip may conveniently be made by first suitably supporting the discs on a notched rod of non-corrodable metal, such as nichrome, in such manner that the discs are separated from each other, and then submerging the rod with the discs assembled upon it in the acid solution. Following the removal of the elements from the acid solution they are preferably thoroughly rinsed immediately in running tap water and then dried to remove all traces of the acid.

The addition of this quick dip and rinse to the previously described Dowling and McCluer and Dowling processes adds little in expense and time to these processes, but gives an enormous improvement in the back current of those discs which have had an unsatisfactorily high back current before the dip. For example, one disc having a back current of 50 milliamperes before the quick dip had a back current of about 1 and ½ milliamperes after the quick dip. This dip and rinse may be used only on those discs which after tests are found to exhibit high back currents, or it can be made a routine step in processing all plated discs. The quick dip does not injure those discs which have normal back currents following the plating process, but as a matter of fact seems to clean up the edges of the oxide layers of these discs in a manner which is believed to be beneficial even though the results insofar as back currents are concerned are unaffected.

Although I have herein shown and described only a few forms of rectifiers and processes for manufacturing said rectifiers embodying my invention, it is to be understood that various changes and modifications may be made therein within the scope of the appended claims without departing from the spirit and scope of my invention.

Having thus described my invention, what I claim is:

1. In the process of making electrical contact with the oxide surface of a copper oxide rectifier element by coating all but the edges of the oxide surface with a layer of nickel, the step which consists in treating the coated element with concentrated nitric acid to reduce the back current.

2. In the process of making electrical contact with the copper oxide surface of a copper oxide rectifier element which comprises electrolytically forming a coating of nickel on all but the edges of the oxide surface, the step which consists in treating the plated element with concentrated nitric acid to reduce the flow of current through the element in the high resistance direction.

3. In the process of making electrical contact with the copper oxide surface of a copper oxide rectifier element by plating all but the edges of the oxide surface with nickel, the step following the plating which consists in treating the element with nitric acid to improve the electrical characteristics of the element.

4. In the process of making electrical contact with the copper oxide surface of a copper oxide rectifier element by plating all but the edges of the oxide surface with nickel, the step following the plating which consists in treating the element with nitric acid to improve the electrical characteristics of the element and then washing the element with water to remove all traces of the acid.

5. The step in the process of making electrical contact with the oxide surface of a copper oxide rectifier element by plating a layer of nickel on all but the edges of the oxide surface, which step consist in subjecting the nickel plated element to the action of concentrated nitric acid for a relatively short period of time.

6. The step in the process of making electrical contact with the oxide surface of a copper oxide rectifier element by plating a layer of nickel on all but the edges of the oxide surface, which step consists in subjecting the nickel plated element to the action of concentrated nitric acid for a time interval of the order of one second.

7. The process of preparing an electrical rectifier element which consists in treating an oxidized blank to reduce all but the edges of the outer surface of the oxide layer to metallic copper, subsequently plating the reduced surface with nickel, and then subjecting the element to the action of nitric acid to improve its electrical characteristics.

8. The process of preparing an electrical rectifier element which consists in treating an oxidized blank to reduce all but the edges of the outer surface of the oxide layer to metallic copper, subsequently plating the reduced surface with nickel, and then subjecting the element to the action of nitric acid to reduce the back current which the element will pass at a given voltage.

9. The process of preparing an electrical rectifier element which consists in treating an oxidized blank to reduce all but the edges of the outer surface of the oxide layer to metallic copper, subsequently plating the reduced surface with nickel, subjecting the element to the action of concentrated nitric acid for a short period of time, and then washing the element to remove all traces of the acid.

10. The process of preparing a rectifier element which consists in oxidizing one side of a copper blank to form thereon a coating of copper oxide, masking the edges of said blank, electrolytically coating the oxide surface with a layer of nickel, removing the mask, and subjecting the element to the action of concentrated nitric acid.

11. The process of preparing a rectifier element which consists in oxidizing one side of a copper blank to form thereon a coating of copper oxide, masking the edges of said blank, electrolytically reducing the exposed portion of the oxide surface to metallic copper, nickel plating the copper surface produced by said last mentioned step, removing the mask, and then subjecting the element to the action of concentrated nitric acid for a short period of time.

12. The process of preparing a rectifier element which consists in oxidizing one side of a copper blank to form thereon a coating of copper oxide, masking the edges of said blank, electrolytically reducing the exposed portion of the oxide surface to metallic copper, nickel plating the copper surface produced by said last mentioned step, removing the mask, subjecting the element to the action of concentrated nitric acid for a short period of time, and then washing the blank to remove all traces of the acid.

HERBERT L. TAYLOR.